United States Patent [19]

Anizan et al.

[11] Patent Number: 4,692,892

[45] Date of Patent: Sep. 8, 1987

[54] PARALLEL ANALOG DEVICE FOR THE LOCAL PROCESSING OF A BIDIMENSIONAL SIGNAL

[76] Inventors: Paul Anizan, A2, Res d'Armor; Daniel Collobert, Ker Skrivell Izellan Ploulec'h, both of 22300 Lannion; Dominique Massaloux, 109 Rue St Guirec-Ploumanac'h, 22700 Perros-Guirec, all of France

[21] Appl. No.: 795,839

[22] Filed: Nov. 7, 1985

[30] Foreign Application Priority Data

Nov. 7, 1984 [FR] France ................................ 84 16948

[51] Int. Cl.$^4$ ........................ G06G 7/00; G06K 9/36; G02F 1/13
[52] U.S. Cl. .................................... 364/807; 350/342; 382/41
[58] Field of Search .............. 364/807, 837, 822, 602, 364/861, 713; 350/374, 342, 330; 382/41, 54; 377/57, 60; 358/160, 166, 209

[56] References Cited

U.S. PATENT DOCUMENTS

| | | | |
|---|---|---|---|
| 4,084,880 | 4/1978 | Clow ................................ | 364/713 X |
| 4,272,157 | 6/1981 | Collins, Jr. et al. ................ | 350/342 |
| 4,351,589 | 9/1982 | Chavel et al. .................... | 350/342 X |
| 4,539,591 | 9/1985 | Zermeno et al. ................ | 358/209 X |
| 4,568,977 | 2/1986 | Chamberlain et al. ............ | 382/54 X |
| 4,623,923 | 11/1986 | Orbach ................................ | 358/166 |

OTHER PUBLICATIONS

The Radio and Electronic Engineer, vol. 50, No. 5, May 1980, pp. 249-257, Institution of Electronic and Radio Engineers, London, GB; Chamberlain: "Advances in C.C.D. Scanners with On-Chip Signal Processing for Electronic Imaging" * Page 249, lines 23-32; p. 253, left-hand column, line 30—p. 254, left-hand column, line 13*.

SPIE International Optical Computing Conference, vol. 232, II, 10-11 Apr. 1980, Washington U.S., pp. 128-136, IEEE, New York, U.S.; B. H. Soffer et al.: "Optical Computing with Variable Grating Mode Liquid Crystal Devices" * FIGS. 1,2,8*.

Optical Engineering, vol. 19, No. 3, May/Jun. 1980, pp. 421-424, Bellingham, U.S.; J. E. Hall et al.: "Real-Time Image Enhancement Using 3×3 Pixel Neighborhood Operator Functions" entire document.

*Primary Examiner*—Jerry Smith
*Assistant Examiner*—Charles B. Meyer

[57] ABSTRACT

An analog parallel device for the local processing of a bidimensional signal comprises an input means, a processing means and an output means, the input means receiving the bidimensional signal and supplying, on a group of elementary input points organized in matrix-like manner, a group of parallel electrical input signals, the processing means receiving said input signals and supplying, on a group of elementary output points organized in matrix-like manner, a group of parallel electric output signals, each of which is obtained by a linear or non-linear combination of a plurality of input signals, the output means receiving said output signals, said means being realized in the form of thin films on a substrate.

This device may be particularly applied to local image processing.

10 Claims, 6 Drawing Figures

PARALLEL ANALOG DEVICE FOR THE LOCAL PROCESSING OF A BIDIMENSIONAL SIGNAL

BACKGROUND OF THE INVENTION

The present invention relates to a parallel analog device for the local processing of a bidimensional signal. This processed signal can be optical, electrical, acoustic or of some other nature.

In the case where the signal received is a bidimensional optical signal, i.e. an image, the device according to the invention can be advantageously used in numerous fields including medical imaging, robotics (recognition of shapes), videocommunications (compression of information), meteorology, etc. In the case of an acoustic bidimensional signal, the device according to the invention can be used for carrying out processing, such as of an acoustic histogram.

The local processing of a bidimensional signal is carried out by a means receiving, in parallel, a group of component signals organized in accordance with a matrix of p rows and n columns (in which $p > 1$ and $n > 1$) and supplying, in parallel, a group of component signals organized in the same way, where each output component signal is a function of the input component signal of the same rank in the matrix and input component signals in the vicinity of said input component signal.

The function connecting an output component signal to a group of input component signals is called the processing operator which can be linear or non-linear. A window defines the number of input component signals contributing to an output component signal.

In the case where the bidimensional signal is an optical signal, the device makes it possible to carry out processing operations such as smoothing, noise elimination, contrast increase, a detection of contours, patterns or textures, etc.

Throughout the remainder of the text, attention will essentially be directed at devices for the local processing of an image (in the conventional sense it is therefore a bidimensional optical signal). It is obvious that this example is taken for illustration purposes, whereas the invention applies to all such signals, no matter what their nature.

A description will now be given of the main local image processing means according to the prior art. These devices can be classified in two categories, namely digital devices and analog devices.

Local image processing is mainly performed by digital devices. This processing, performed on a conventional computer, is slow because the number of elementary operations is high and approximately $10^6$ for a $320 \times 320$ point image with a $3 \times 3$ point window. Thus, for example, the local processing of a $512 \times 512$ point image on a Digital Equipment PDP 11 mini-computer takes approximately 30 seconds calculation.

In order to reach processing speeds compatible with the speed of a video signal supplying 25 images per second in accordance with European standards or 30 images per second in accordance with U.S. and Japanese standards, it is necessary to either use a very powerful computer, or special systems of the parallel processor or systolic machine type. These different systems suffer from the disadvantage of being very complex to realize and program, whilst also being very onerous.

In addition, devices for the analog local processing of an image are know. In principle, these devices require a very high parallelism, because there is a simultaneous processing of all the points of the image. These devices are produced either with the aid of discrete components, or by assembling integrated circuits each processing about 100 image points. Thus, these devices cannot be used for processing normal sized images, i.e. having at least $10^5$ image points, due to the number of discrete components or the number of integrated circuits which would be necessary, the complexity of their assembly and their cost.

SUMMARY OF THE INVENTION

The object of the present invention is to obviate the disadvantages of the known type. This object is achieved by a parallel analog local processing device in thin film form. This technology offers a very high processing speed making it possible to process in real time video signals, such as television signals. Moreover, this thin film technology is used in known manner for realizing matrixes of transistors for addressing flat-faced screens. Thus, this technology is suitable for the processing of images having $10^5$ or more elementary points. In addition, this technology offers the advantage of lending itself to mass production and therefore to the production of a processing device at low cost. Finally, the realization of the processing device in the form of thin films permits its integration into image recording or plotting means, such as solid cameras or flat-faced screens.

More specifically, the present invention relates to a device for the parallel analog local processing of a bidimensional signal comprising an input means, a processing means and an output means, the input means receiving the said bidimensional signal and supply on a group of elementary input points organized in matrix-like form, a group of parallel electric input signals, the processing means receiving said input signals and supplying on a group of elementary output points organized in matrix-like manner, a group of parallel electric output signals, each electric output signal being obtained by the linear or non-linear combination of a plurality of input signals, the output means receiving said output signals, said means being reali edzin the form of thin films on a substrate.

The number of elementary output points is generally equal to the number of elementary input points. However, in certain special cases, these numbers can differ.

According to a preferred embodiment, the processing of each input signal is limited to one spatial window of a given size.

In preferred manner, for the processing of a bi-dimensional optical signal, the input means has a photo-conductive layer.

In preferred manner, for the processing of a bi-dimensional electrical signal, the input means has an addressing matrix.

According to a preferred embodiment, the output means has a display means, which can e.g. be a liquid crystal display. This permits a direct display of the processed bidimensional signal.

According to another preferred embodiment, the output means comprises an addressing matrix. In a preferred manner, the processing means comprises at least one resistive layer and a group of layers alternatively having insulating layers and groups of etched conductive lines.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
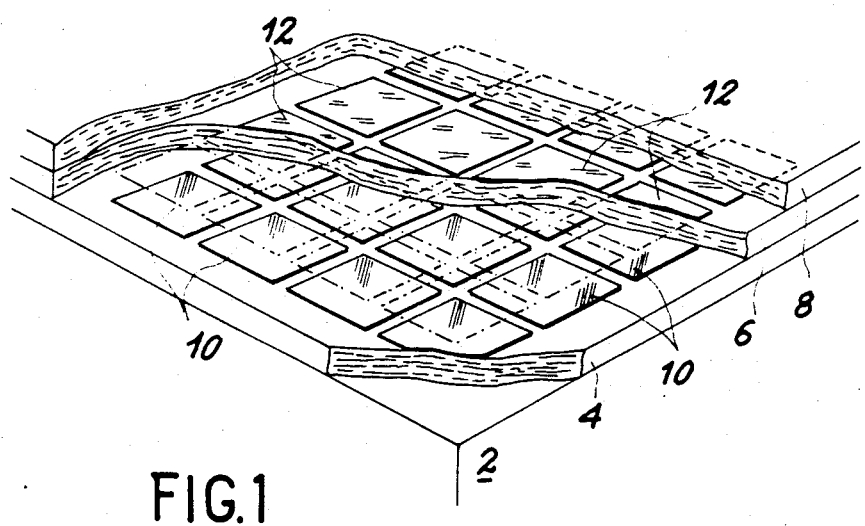
FIG. 1 Diagrammatically the layer structure of the processing device according to the invention.

FIG. 1 illustrates the structure of the processing device according to the invention. This device is constituted by an input means, a processing means and an output means in the form of thin films on a substrate.

Thus, on substrate 2 are successively arranged a group of layers forming the input means 4, a group of layers forming the processing means 6 and a group of layers forming the output means 8.

Input means 4 receives the bidimensional signal to be processed. This signal can be of a random nature, e.g. optical, electrical, acoustic or of some other type. It can be in the form of a series signal, e.g. a video signal received in the form of an electrical signal, or in parallel form, e.g. an optical image. The function of the input means 4 is to convert this bidimensional signal received into a group of parallel electrical signals organized in matrix-like manner. These parallel signals are supplied to a group of elementary conductive points 10 organized in matrix-like manner and constituting the intermediate layer between the input means 4 and the processing means 6.

Thus, the processing means 6 receives an electrical image formed from a group of points representing the bi-dimensional signal received by the input means 4. On a group of elementary conductive points 12 organized in matrix-like manner, it supplies another electrical image, which is deduced from the electrical image received by applying a mathematical operator to each point of said image received. This processing is of a local nature, i.e. the electrical signal received by an elementary output point 12 is a function of the signal supplied by the elementary input point 10 of the same rank and same column in the matrix and by the signals supplied by the elementary points 10 close to the latter.

In the known local processing devices, the size of the processing window is often 3×3 (the signal supplied by an elementary output point 12 is then a function of signals supplied by an elementary input point 10 and its eight neighbours). The size of the window is limited in the known devices, because the time necessary for calculating an image varies in accordance with the square of the window.

Conversely, the device according to the invention has the remarkable feature that the time for calculating an image is independent of the size of the window. This constitutes a supplementary advantage of the invention, because the use of a window of a larger size generally permits a finer processing of the image.

It is important to point out that although in general the number of elementary output points 12 is equal to the number of elementary input points 10, as shown in FIG. 1, there is no reason why a processing means should not be produced in which the number of elementary output points is larger or smaller than the number of elementary input points. The number of elementary output points can e.g. be smaller than the number of elementary input points in applications such as information compression.

The electrical image processed by the processing means 6 is received by the output means 8. The latter has the function of converting the electrical image received into a bidimensional signal of a type and form adapted to the envisaged processing. Output means 8 can in particular carry out a conversion which is the reverse of that carried out by input means 4.

According to a first preferred embodiment, output means 8 performs an electrooptical conversion of the electrical image supplied by processing means 8. This conversion can e.g. be performed by a display incorporating a liquid crystal film.

It is known that liquid crystals are rapidly degraded, because they are subject to a d.c. voltage. It is therefore obvious that in an embodiment of the device according to the invention in which the processing means has a liquid crystal film, the input means 4 must supply at each elementary input point 10 an electrical signal of zero mean value, e.g. an a.c. voltage signal.

According to another preferred embodiment of the device according to FIG. 1, the output means 8 has an addressing matrix making it possible to multiplex the electrical signals supplied by each of the elementary output points 12, in order to transmit the processed image in the form of a frame of a video signal.

A description will now be given in exemplified manner of a first embodiment of the processing device according to the invention, in which the mathematical processing operator is a linear operator and a second embodiment of the processing device according to the invention in which the mathematical operator is non-linear, but can be expressed with the aid of two linear operators. As will be shown hereinafter, these linear functions can easily be represented in the processing means 6 by a resistive layer.

Thus, the processing device according to the invention is not limited to linear operators and can in fact realize very varied operators. For example, it is possible to realize an operator having a threshold effect by placing a group of thin films forming a diode in processing means 6. These non-linear operators are in practice used less than the linear operators.

The realisation of a processing means including a non-linear operator is from the formal standpoint identical to realizing a processing means including a linear operator. The difference is based on the fact that the resistive layer is replaced or completed by one or more layers of different types. These modifications fall within the routine activity of the expert. Therefore, a description will only be provided of two embodiments of the device according to the invention in which the processing means includes a linear operator or a non-linear operator, which can be expressed with the aid of two linear operators.

In general terms, and this is the case of the operators used in the devices described hereinafter, the operator simultaneously has positives coefficients and negatives coefficients. However, the resistive layer of the processing means 6 only makes it possible to express the absolute value of these coefficients. In order to be able to realize the operator, it is therefore necessary for the input means 4 to supply at each elementary input point 10, the voltage signal associated with said elementary input point and the opposite voltage signal. In practice, each elementary input point 10 can be constituted by a plurality of separated conductive elements.

A description will now be given of a local image processing device according to the invention leading to an increase in the contrast of the image received, so as to permit a better detection of contours. This Laplacian-type operator is shown in the following table 1 with a 3×3 processing window.

TABLE 1

| −1 | −1 | −1 |
| −1 | 8  | −1 |
| −1 | −1 | −1 |

This operator makes it possible to supply at each elementary output point of the processing means a voltage signal equal to eight times the voltage signal of the corresponding elementary input point reduced by the sum of the voltage signals of the elementary points adjacent to said elementary input point.

Figure 3:
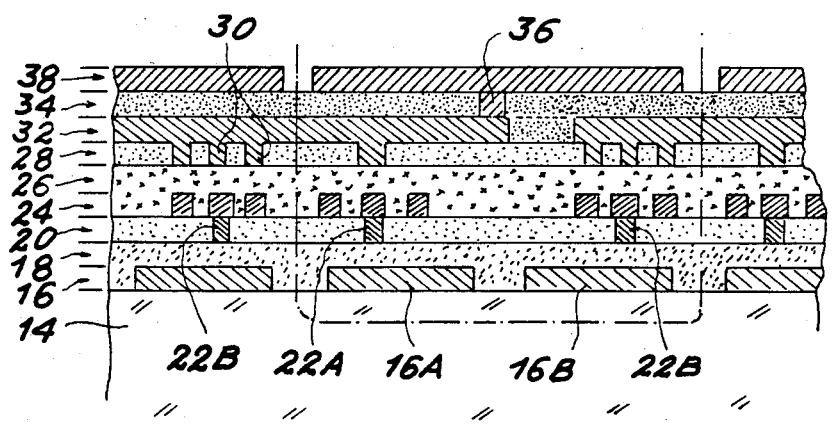
FIG. 3 A view along A of plane P in FIG. 2.
Figure 2:
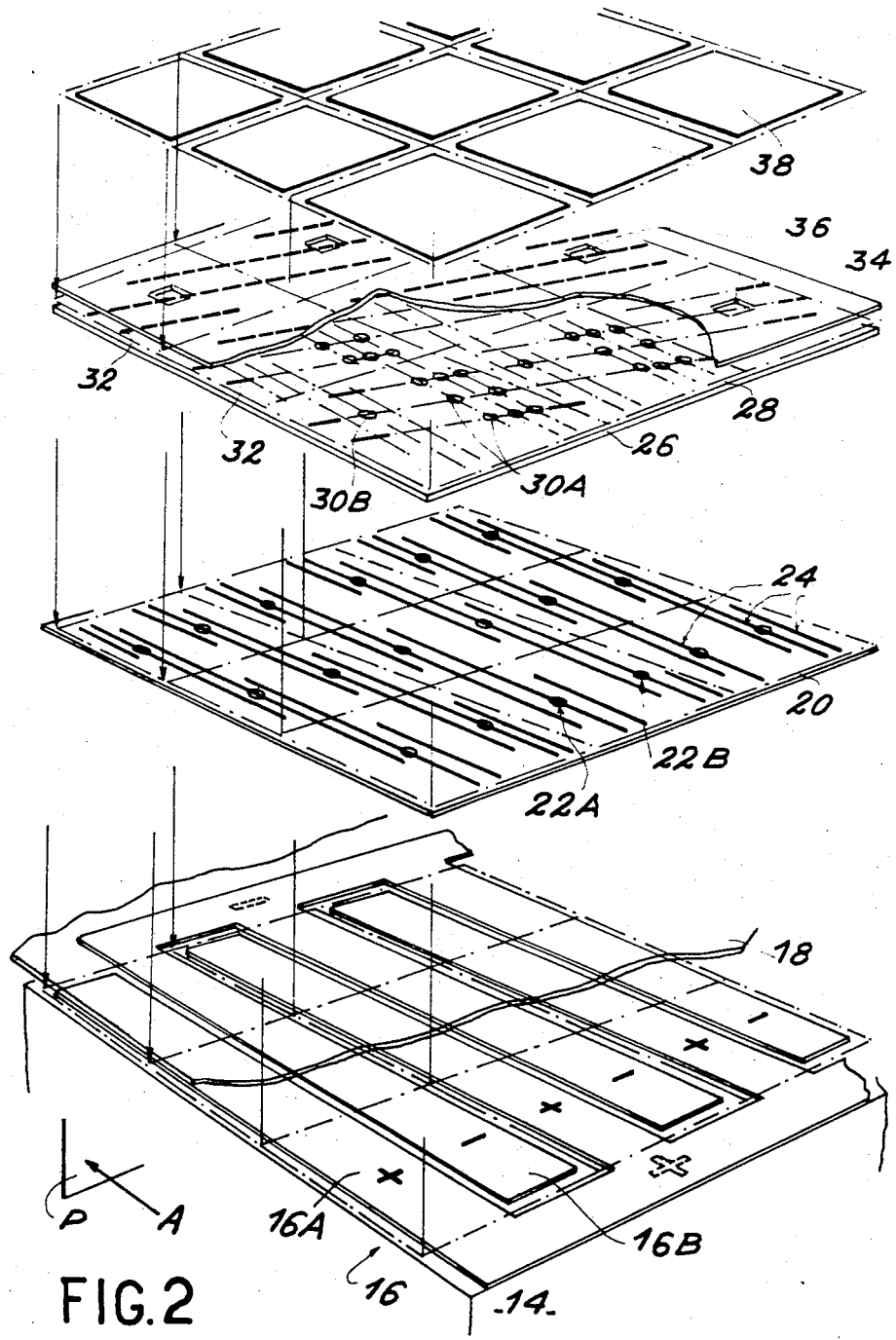
FIG. 2 An exploded view showing an embodiment of the processing device according to the invention with an input means performing an optoelectrical conversion and a processing means defining a linear mathematical operator.

FIG. 2 is an exploded view of the input means and the processing means of a processing device according to the invention implementing said operator. It will be described in conjunction with FIG. 3 showing a section along A of plane P of FIG. 2. The input means shown therein is of the solid camera type and permits the conversion of a light image into a group of parallel electrical signals arranged in matrix-like manner.

This input means comprise a group of thin films deposited and etched on a transparent substrate 14. Each of these films has a thickness of approximately 100 nanometers. The input means comprises three films or layers:

- a transparent conductive film 16 in which are etched two interdigitated transducers 16A, 16B providing two opposite voltages at each elementary input point,
- a conductive film 18 for converting the light intensity received by an elementary input point into an electrical signal,
- an electrically insulating film 20 in which are made two holes 22A, 22B for each elementary point and respectively positioned facing conductor 16A and conductor 16B.

The light image processed by the processing device is received through the transparent substrate 14. It passes through the conductive film 16 made e.g. from indium oxide or tin oxide, which is transparent to light rays if the thickness of the film is not excessive. This light signal received by an elementary point is converted into two electrical signals of opposite signs by the photoconductive film 18, e.g. made from amorphous hydrogenated silicon. The amplitude of these electrical signals is a function of the light intensity received by the elementary point.

The photoconductive film 18 is covered with an insulating film, e.g. of SiO₂ in which are formed two holes 22A, 22B for each elementary point. The bases of these holes constitute the conductive elements of the elementary input point and ensure the connection between the input means and the processing means.

In the embodiment of FIG. 2, this processing means comprises:

- a first conductive film in which is etched a group of parallel conductive lines 24,
- a resistive film 26,
- an insulating film 28,
- a second conductive film in which is etched a second group of parallel conductive lines 32, each of said lines being, connected to the resistive film by a plurality of contact holes made in the insulating film 28,
- an insulating film 34.
- a third conductive film in which are etched the elementary output points, 38, each connected to a conductive line 32 by a hole 36 in insulating film 34.

These different films can be produced in accordance with any known process and from any known material. The conductive films can in particular be of Al, the insulating films of SiO₂ and the resistive film doped Si-H.

The first conductive film is etched so as to produce a group of parallel conductive lines 24, each line having a length which is substantially equal to the size of the processing window and is centred on a contact hole 22A, 22B of insulating film 20.

Film 22 is successively covered with a resistive film 26 and an insulating film 28 in which are made holes 30A, 30B. These holes are positioned in reletion with the conductive lines of film 24.

The electrical voltage taken in each hole 30A, 30B is consequently a function of three factors, namely the resistivity of film 26, the voltage present on the conductive line of film 24 facing said hole and finally the surface of the hole. As film 26 has a homogeneous resistivity, the resistivity differences to the right of each hole 30A, 30B are essentially a function of the surface of said hole.

This makes it possible to obtain the different coefficients of the processing operator. Thus, in the case of a conductive line 32 etched in the second conductive film deposited on the insulating film 28, said line 32 is positioned so that it is connected, via holes 30A, 30B, to the conductive lines etched in film 24. More specifically, said conductive line 32 is connected to nine conductive lines of film 24 (for a 3×3 window), said conductive lines supplying voltage signals, whose sign corresponds to the sign of the processing operator coefficient.

In the particular case of the Laplacien operator considered, the central coefficient of the operator is eight times greater than the other coefficients. In order that this coefficient difference appears during summation on conductive line 32 of the signals supplied by conductive lines 24, it is necessary for the contact hole 30B connecting the conductive line 32 associated with an elementary point and the conductive line etched in film 24 associated with the same elementary point to have a larger surface than the other contact holes 30A connecting said conductive line 32 to the conductive lines 24 corresponding to the neighbours to said elementary point.

For each elementary point, the signal resulting from the application of the processing operator to said elementary point and to its neighbours is consequently obtained by conductive line 32. These conductive lines 32 form a group of parallel lines substantially perpendicular to the group of parallel conductive lines etched in film 24.

Finally the processing means is provided with an insulating film 34 in which there is a contact hole 36 for each elementary point. This insulating film is covered by a conductive film in which are etched elementary output points 38, which are in contact with a conductive line 32 via contact holes 36.

With reference to FIGS. 2 and 3 a processing device according to the invention has been described which uses a conventional mathematical operator. It has been shown that the realization of the device according to the invention leads to no particular difficulties, the technology of thin films having been mastered in numerous technologies and only a small number of films is required for producing the processing means.

It should be noted that the output means of the processing device has not been shown in FIGS. 2 and 3. Preferred embodiments of the output means have been referred to hereinbefore, namely an addressing matrix making it possible to supply a multiplex electrical signal and a liquid crystal display permitting a direct display of the bidimensional signal after treatment.

As the practical realization of the different output means is well known in fields close to those of the invention, there is no need to go into further detail regarding the different embodiments of the output means which fall within the routine scope of the expert. However, it has been considered worthwhile to describe the input means because, although solid cameras are known and are based on an identical principle to that of the input means described, said input means has arrangements for the purpose of supplying two opposite voltage signals at each elementary point.

The processing device described hereinbefore essentially has four films, two conductive line films 24, 32, a resistive film 26 and a photoconductive film 18. It is possible to simplify the device by realizing the input means and the processing means with the aid of only two main films, namely a photoconductive and resistive film and a conductive line film. A processing device according to the invention based on this simplified embodiment will now be described relative to FIGS. 4A, 4B and 4C.

This simplified embodiment can be used for representing numerous mathematical operators and particularly the Laplacien operator described relative to FIGS. 2 and 3. To illustrate this second embodiment, a description will be given of a processing device implementing a non-linear operator, namely the SOBEL operator. It can be looked upon as a vector operator having two components, each formed from a linear operator.

This operator has 18 coefficients (for a $3 \times 3$ window) among which 6 coefficients are zero. The number of non-zero coefficients to be replaced by connections in the processing means remains high. Therefore the realization of the processing means is far from easy, particularly in the embodiment only having one photoconductive and resistive film and one conductive line film.

This operator can be simplified to retain a smaller number of coefficients. A description will be given of an embodiment of the device according to the invention using a truncated SOBEL operator with only 8 non-zero coefficients. It has been experimentally found that for any applications, this operator supplies results very close to those of the SOBEL operator.

The components of the truncated SOBEL operator are shown in the following table 2.

TABLE 2

$$G_x = \begin{matrix} 1 & 2 & 0 \\ 0 & 0 & 0 \\ 0 & -2 & -1 \end{matrix} \qquad G_y = \begin{matrix} 0 & 0 & -1 \\ 2 & 0 & -2 \\ 1 & 0 & 0 \end{matrix}$$

The truncated SOBEL operator consists of applying the component operator $G_x$ to each group of 9 elementary input points (for a $3 \times 3$ window) for supplying a first component of an output signal and then the component operator $G_y$ for supplying a second component of an output signal, the signal supplied by the elementary output point being equal to the modulus of said output signs). This modulus can be particularly easily obtained in the case where the signals received by the processing means are a.c. signals. Thus, in this case, the modulus of the output signal is simply equal to the sum of its components if the latter are in quadrature.

As the truncated SOBEL operator is formed from two linear operators, each elementary input point has four conductive elements, two conductive elements being associated with the operator $G_x$ and supplying signals of opposite voltage whose intensity is a function of the bidimensional signal received and two other conductive elements associated with the operator $G_y$ and supplying signals of opposite voltage which are also a function of the bidimensional signal received.

In the special case which is of interest in practice, where these voltage signals are a.c. signals, the two conductive elements associated with the operator $G_x$ receive two opposite a.c. signals and the two conductive elements associated with the operator $G_y$ receive two other opposite a.c. signals, said signals associated with the operator $G_x$ and said other signals associated with the operator $G_y$ being in quadrature.

Figure 4A:
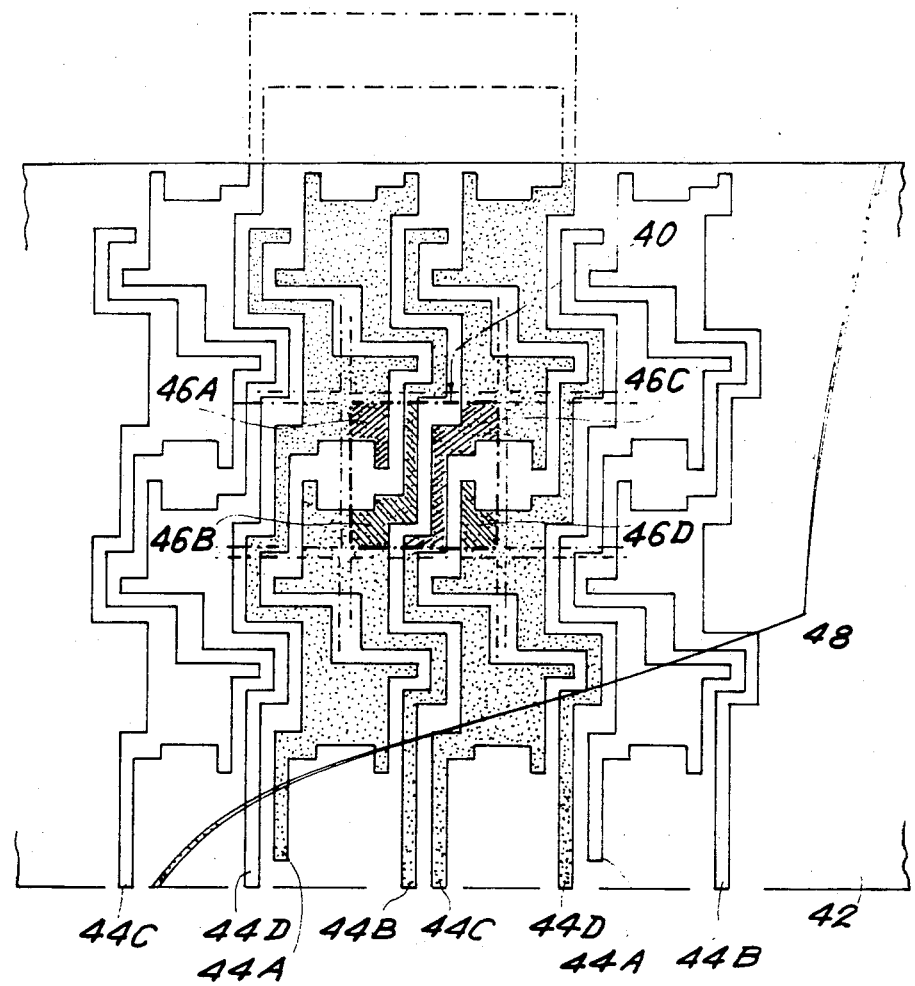
FIGS. 4A, 4B, and 4C An embodiment of the processing device according to the invention, in which the input means performs an optoelectrical conversion and in which the processing means defines a non-linear mathematical operator.

FIG. 4A shows in exemplified manner an input means for carrying out an optoelectrical conversion of a bidimensional optical signal supplying, for each elementary point, 4 a.c. voltages in the manner indicated hereinbefore.

This input means comprises a group of 4 electrical conductors 44A, 44B, 44C, 44D etched in a conductive film deposited on a transparent substrate 42. These conductors have a geometry and are interleaved in such a way that a fraction of each of them is located above each elementary point 40. These fractions constitute the conductive elements 46A, 46B, 46C and 46D associated with the elementary point 40.

The conductive elements defined here are not identical to the conductive elements 24 defined with reference to FIGS. 1 to 3, because they carry a fixed modulus supply voltage and not a voltage which is a function of the bidimensional signal received. It is not possible here to define an elementary input point in the sense of FIGS. 1 to 3, i.e. a group of conductive elements electrically connecting the input means to the processing means.

The conductive elements 46A and 46D receive opposite a.c. voltage signals. In the same way, the conductive elements 46B and 46C receive opposite a.c. voltage signals, said signals being in quadrature with the signals received by the conductive elements 46A and 46D.

Figure 4B:
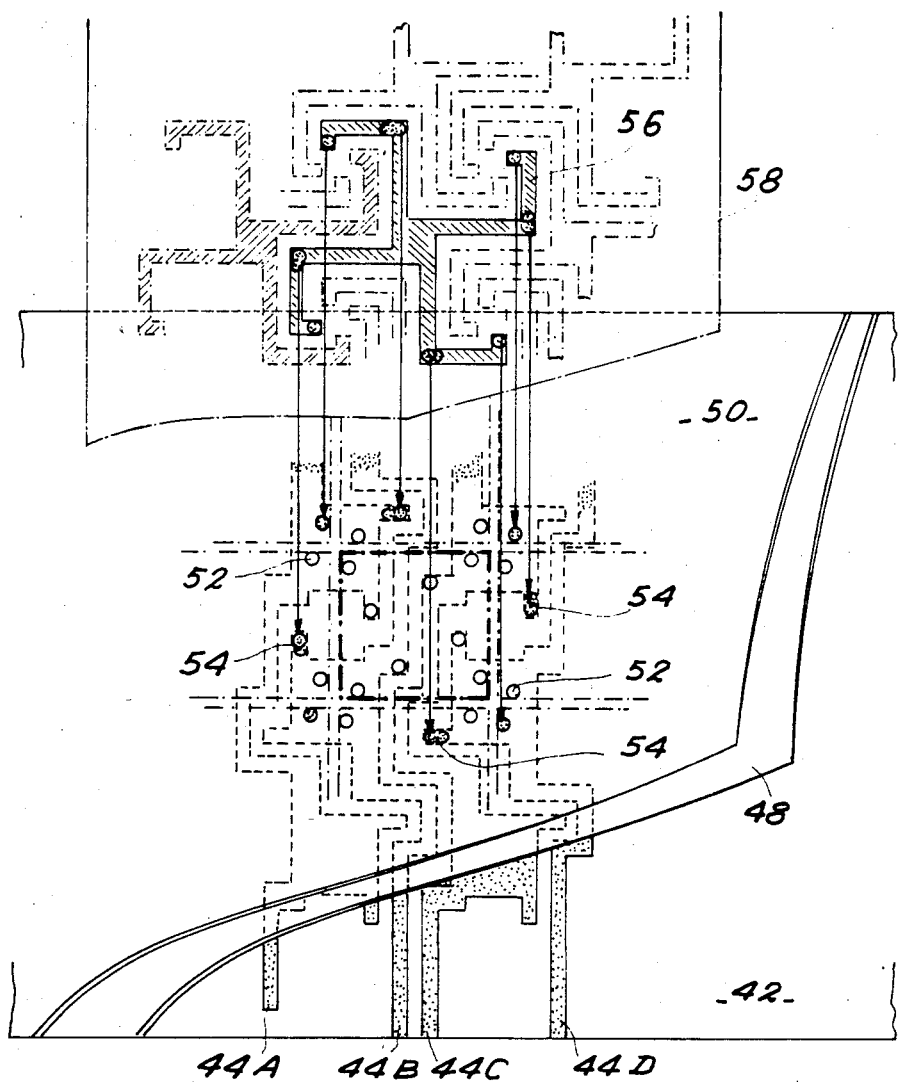

A photoconductive, resistive film 48 is deposited on the electrical conductors. This film can be of an appropriately doped 31-H and is itself covered with an electrically insulating film 50 having a plurality of holes 52, 54, as shown in FIG. 4B. As stated hereinbefore, the voltage at the base of each hole reflects the light intensity of the optical signal received by the elementary input point having a coefficient linked with the size of said hole and having a sign (a phase for an a.c. signal) linked with the input conductor SCOVO which said hole is located.

For the truncated SOBEL operator, the non-zero coefficients are in absolute values equal to 1 or 2. In the processing means, said coefficients are respectively translated by holes 52 and 54, holes 52 being smaller than holes 54.

These holes make it possible to bring about an electrical contact between on the one hand the photoconductive, resistive film 48 and on the other the conductive elements 56 etched in a conductive film 58 deposited on the insulating film 50. Each conductive element 56 simultaneously receives the four signals corresponding to the four coefficients of component $G_x$ of the truncated SOBEL operator and the 4 signals corresponding to the 4 coefficients of component $G_y$ of the truncated SOBEL operator.

The voltage present on each conductive element 56 is consequently equal to the modulus of the signal, whose components are output signals respectively corresponding to operators $G_x$ and $G_y$. Thus, this voltage is the output voltage of the elementary point.

Figure 4C:
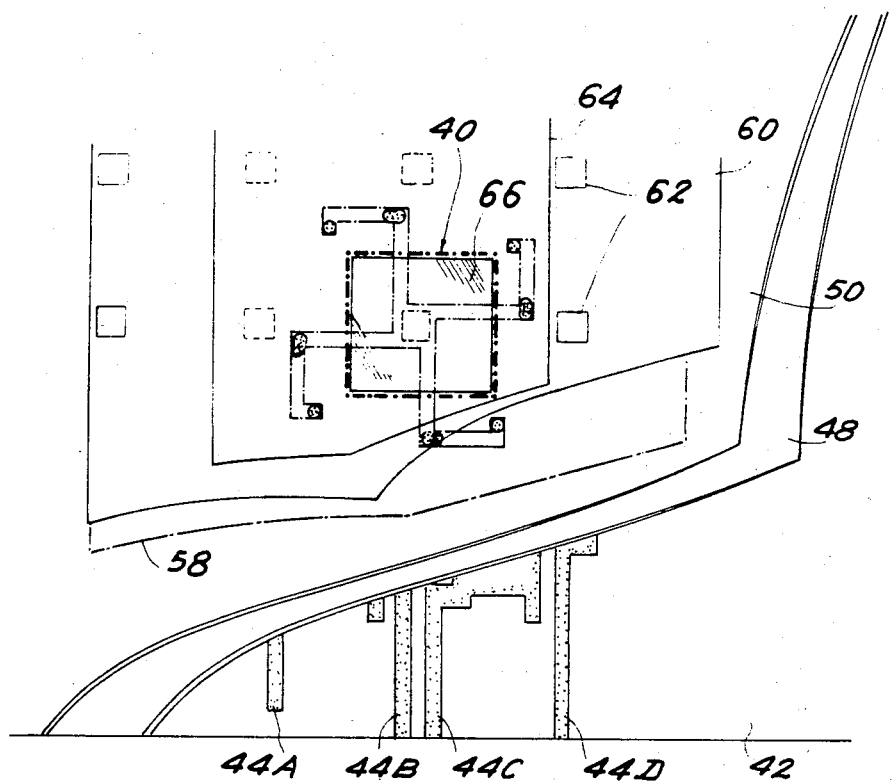

As shown in FIG. 4C, this conductive film 58 is covered with an insulating film 60 in which are made contact holes 62, each corresponding to an elementary point. This insulating film 60 is itself covered with a conductive film 64 in which are etched the elementary output points 66.

The electrical image formed by the group of voltage signals supplied by the elementary output points can be exploited in any known manner. Advantageously it is possible to cover the conductive film 62 with a liquid crystal film and then by a transparent electrode connected to ground. The output means constituted by these two latter films then forms a liquid crystal display making it possible to directly display the processed image. According to another advantageous embodiment, the output means can be constituted by an addressing matrix for transmitting the processed image in the form of a frame of a video signal.

What is claimed is:

1. An analog parallel device for the local processing of a bidimensional signal comprising a substrate; an input means formed from at least one thin film, said films being deposited and etched on said substrate, said input means receiving said bidimensional signal and supplying a group of parallel electrical input signals to a group of elementary points organized in matrix-like manner; a processing means constituted by at least one thin film, said thin films being deposited and etched on said input means, said processing means receiving said parallel electrical input signals and supplying a group of elementary points organized in matrix-like manner, at least one electrical output signal being obtained by the linear or non-linear combination of a plurality of electrical input signals; and an output means formed from at least one thin film, said films being deposited and etched on said processing means, said output means receiving said parallel electrical output signals.

2. A device according to claim 1, wherein the processing of each input signal is limited to a spatial window of a given size.

3. A device according to claim 2 for the processing of a bidimensional optical signal, wherein the input means incorporates a photoconductive film.

4. A device according to claim 2 for processing a bidimensional electrical signal, wherein the input means has an addressing matrix.

5. A device according to claim 2, wherein the output means has a display.

6. A device according to claim 5, wherein the display is a liquid crystal display.

7. A device according to claim 2, wherein the output means comprises an addressing matrix.

8. A device according to claim 2, wherein the processing means comprises at least one resistive film and a group of films alternately incorporating insulating films and groups of etched conductive lines.

9. A device according to claim 8, wherein the processing means successively comprises a first insulating film; a group of parallel conductive lines each receiving a voltage signal by a connection traversing the insulating film, the intensity of said signal being linked with the bidimensional signal received by an elementary point; a resistive film; a second insulating film having contact holes in relation with the conductive lines; a second group of conductive lines, each connected to the resistive film by a plurality of connections by means of holes; a third insulating film having one hole for each elementary point and a group of elementary conductive points, each connected to a conductive line by a hole.

10. A device according to claim 8, wherein the processing means comprises a photoconductive, resistive film, an insulating film having holes, a group of conductors, an insulating film having one hole for each elementary point and a group of elementary conductive points, each connected to a conductor by a hole.

* * * * *